United States Patent
Hanai et al.

(10) Patent No.: US 7,868,755 B2
(45) Date of Patent: Jan. 11, 2011

(54) SENSOR ATTACHED IC TAG APPLICATION HIGH VOLTAGE EQUIPMENT

(75) Inventors: Masahiro Hanai, Fujisawa (JP); Haruhisa Wada, Yokohama (JP); Hirokazu Takagi, Yokohama (JP); Shiro Maruyama, Yokohama (JP); Masayuki Sato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 229 days.

(21) Appl. No.: 11/868,111

(22) Filed: Oct. 5, 2007

(65) Prior Publication Data
US 2008/0087115 A1    Apr. 17, 2008

(30) Foreign Application Priority Data
Oct. 12, 2006    (JP) .............................. 2006-279140

(51) Int. Cl.
*G08B 1/06*    (2006.01)
*G08B 21/00*   (2006.01)
*H04B 1/03*    (2006.01)
*H05K 5/02*    (2006.01)
*H05K 9/00*    (2006.01)

(52) U.S. Cl. .................. 340/539.22; 340/635; 361/814; 361/816

(58) Field of Classification Search ............ 340/539.22, 340/635; 361/814, 816
See application file for complete search history.

(56) References Cited

U.S. PATENT DOCUMENTS

| 4,373,163 | A | * | 2/1983 | Vandebult ................... 343/842 |
| 5,550,552 | A | * | 8/1996 | Oxley ......................... 343/702 |
| 5,573,610 | A | * | 11/1996 | Koch et al. ............... 152/152.1 |
| 5,767,789 | A | * | 6/1998 | Afzali-Ardakani et al. . 340/10.1 |
| 5,821,453 | A | * | 10/1998 | Epstein et al. .............. 174/388 |
| 6,014,083 | A | * | 1/2000 | Bauerschmidt et al. ..... 340/635 |
| 6,504,382 | B2 | * | 1/2003 | Smith et al. ................. 324/551 |
| 6,930,491 | B2 | * | 8/2005 | Gregory et al. ............. 324/536 |
| 2002/0135558 | A1 | * | 9/2002 | Richley ...................... 345/107 |
| 2003/0214307 | A1 | * | 11/2003 | Kang et al. ................. 324/536 |
| 2005/0196180 | A1 | * | 9/2005 | Harumoto .................... 399/12 |
| 2005/0214974 | A1 | * | 9/2005 | Field et al. .................. 438/106 |
| 2005/0275591 | A1 | * | 12/2005 | King et al. ............ 343/700 MS |

* cited by examiner

*Primary Examiner*—Benjamin C Lee
*Assistant Examiner*—Andrew Bee
(74) *Attorney, Agent, or Firm*—Oblon, Spivak, McClelland, Maier & Neustadt, L.L.P.

(57) ABSTRACT

To shorten a period of time necessary for performing routine inspections and reduce costs by monitoring a state such as a contact failure of a switching equipment which constitutes a power reception circuit or a branch circuit of a substation through a simple construction. A sensor attached IC tag application high voltage equipment is constructed by detachably mounting a sensor attached IC tag at a position where a sensor of a sensor attached IC tag obtains a physical quantity of a detection target, wherein the sensor attached IC tag is configured to communicate with an externally located IC tag reader.

12 Claims, 12 Drawing Sheets

| DATA MAXIMUM CAPACITY | NUMBER OF STORAGE DATA | DATE AND TIME OF PREVIOUS DATA DELETION |
|---|---|---|

4 DGIT (16 PIECES)　　4 DGIT　　32 DGIT (136 YEARS SINCE 2000)
　　　　　　　　　　　　　　　　　　　SECOND TIME SCALE

| SERIAL NUMBER | NUMBER OF DATA STORAGE AREAS |
|---|---|

4 DGIT　　8 DGIT (1024 AREAS)

| TIME | TEMPERATURE |
|---|---|

× (1024) PIECES } 1 AREA

8 DGIT　　8 DGIT

| IC TAG ID NUMBER |
|---|

32 DGIT

TOTAL : (256kB)

SENSOR ATTACHED IC TAG APPLICATION HIGH VOLTAGE EQUIPMENT

BACKGROUND OF THE INVENTION

1. Field of the Invention

The present invention relates to a high voltage equipment for performing transformation and switching of an electric power system. In particular, the invention relates to a sensor attached IC tag is provided with high voltage equipment (hereinafter, referred to as "sensor attached IC tag application high voltage equipment") in which improvement in the safety during an inspection and reduction in inspection costs are achieved.

2. Related Art

In a substation facility such as a substation, in general, an electric power received from an electric power transmission line is supplied via a bus of a primary side to a primary side of an electric transformer. After the electric power is transformed by the electric transformer, the electric power is supplied to a bus of a secondary side and then supplied to a load circuit via a bus on the secondary side.

The substation facility is constructed by a line unit for switching an electric power reception line from an electric power transmission line side to the bus on the primary side, a primary side electric transformer unit for switching an electric transformer circuit between the bus on the primary side and the electric transformer or a secondary side electric transformer unit for supplying an electric power on the secondary side of the electric transformer and the bus on the secondary side, a branch unit for switching a branch circuit from the bus on the secondary side to the load circuit, and the like. In addition, high voltage equipments having substantially the same configuration are installed for the respective units connected to the bus on the primary side or the bus on the secondary side.

Conventional high voltage equipments to be installed in a gas are individually installed with consideration for an insulation distance, an inspection space, and the like in each necessary equipment. Japanese Unexamined Utility Model Registration Application Publication No. 61-186136 and Japanese Unexamined Patent Application Publication No. 2000-253523 disclose an insulator type gas circuit breaker in which a CT (Current Transformer) is mounted to a breaker unit as an example of the conventional high voltage equipments to be installed.

As respectively independent equipments are installed in the conventional gas insulation high voltage equipment, a cable obtained by binding thin copper lines is used between the equipments. The equipments are electrically connected by contacting and fixing this cable to a dedicated connection unit provided for each equipment with use of a fixing tool such as a mounting bolt.

The conventional gas insulation high voltage equipments achieving such electrical connections are usually installed in outdoor locations and exposed to rain. In particular, in recent years, an influence of acid rain along with a development of an aerial pollution due to the presence of an acid substance such as nitrogen dioxide causes an oxidation phenomenon at a part between the cable and the connection unit of the equipment. As the oxidation phenomenon advances in the part between the cable and the connection unit, a resistance at the oxidation part is increased, that is, a thermal loss at the oxidation part is increased. Thus, such problems may occur with degradation of an insulating material of the equipment, loss in electric power transmission, and the like.

In order to solve the above-mentioned problems, conventionally, a method of grasping a temperature rise using infrared rays at a patrol in routine inspections is adopted. Examples of the method of grasping the temperature rise using the infrared rays include a method of performing temperature measurement to detect the temperature rise using an infrared thermometer or the like and a method of detecting the partial temperature rise by capturing an infrared image.

However, according to the method using the infrared thermometer, the number of measurement points is extremely large and it takes much time for patrol for inspection. To carry out the inspection in one day, many persons (manpower) need to join the inspection. On the other hand, according to the method of detecting the local temperature rise by capturing the infrared image, an infrared image pickup apparatus is extremely expensive and can not be easily used.

In addition, these methods using the infrared rays can be employed only at locations where the infrared rays can be directly measured from a spot with a higher temperature. Thus, the temperature measurement cannot be performed through the methods at locations where the infrared rays are blocked by a material through which the infrared rays do not pass.

Upon measuring a partial discharge of a gas insulation switch, a method of sequentially supplying a voltage to each unit of a power system and sequentially inputting a disconnecting switch and a circuit breaker to confirm the presence or absence of the generation of the partial discharge is frequently used.

However, according to the above-mentioned method, in the event that the partial discharge is generated while a certain disconnecting switch or the circuit breaker is input, it is impossible to determine whether the partial discharge is generated on a downstream part of the input equipment or the partial discharge is generated on an upstream part of the equipment connected to a following cable.

SUMMARY OF THE INVENTION

The present invention has been made to solve the above-mentioned problems and it is an object of the present invention to reduce inspection costs by shortening an inspection period of time for inspecting a connection state of a connection part of a cable between equipments performed for each unit constituting an electric power reception circuit or a branch circuit of a substation, shortening an inspection period of time for inspecting a contact part of a switch, and shortening a period of time for specifying a generation part of a partial discharge.

In order to solve the above-mentioned problems, a high voltage equipment to which a sensor attached IC tag is applied (a sensor attached IC tag application high voltage equipment) according to an aspect of the present invention includes: a container filled with an insulating gas; a high voltage unit provided inside the container; and a sensor attached IC tag detachably mounted to a position where a sensor of the sensor attached IC tag obtains a physical quantity of a detection target, wherein the sensor attached IC tag is configured to communicate with an IC tag reader located outside the sensor attached IC tag application high voltage equipment.

The present invention is configured so that the sensor attached IC tag is mounted to the contact point of the high voltage equipment or the cable connection unit, the result is stored in a storage apparatus, and an output is transmitted by an IC tag reader-writer. Therefore, it is possible to shorten the inspection period of time for inspecting the connection state of the connection unit of the cable between equipments performed for each unit constituting the electric power reception circuit or the branch circuit of the substation, shorten the inspection period of time for inspecting the contact part of the switch, and shorten the period of time for specifying the generation part of the partial discharge. As a result, it is possible to reduce the inspection costs.

DESCRIPTION OF THE PREFERRED EMBODIMENTS

Hereinafter, a description will be given of best modes (embodiments) for embodying a sensor attached IC tag is provided with high voltage equipment (hereinafter, referred to as "sensor attached IC tag application high voltage equipment") according to the present invention with reference to the accompanying drawings. Further, it is to be noted that terms indicating directions such as up, down, left and right and the like are used herein with reference to actually used state of the sensor attached IC tag application high voltage equipment or in a state illustrated on the drawings.

Figure 1:
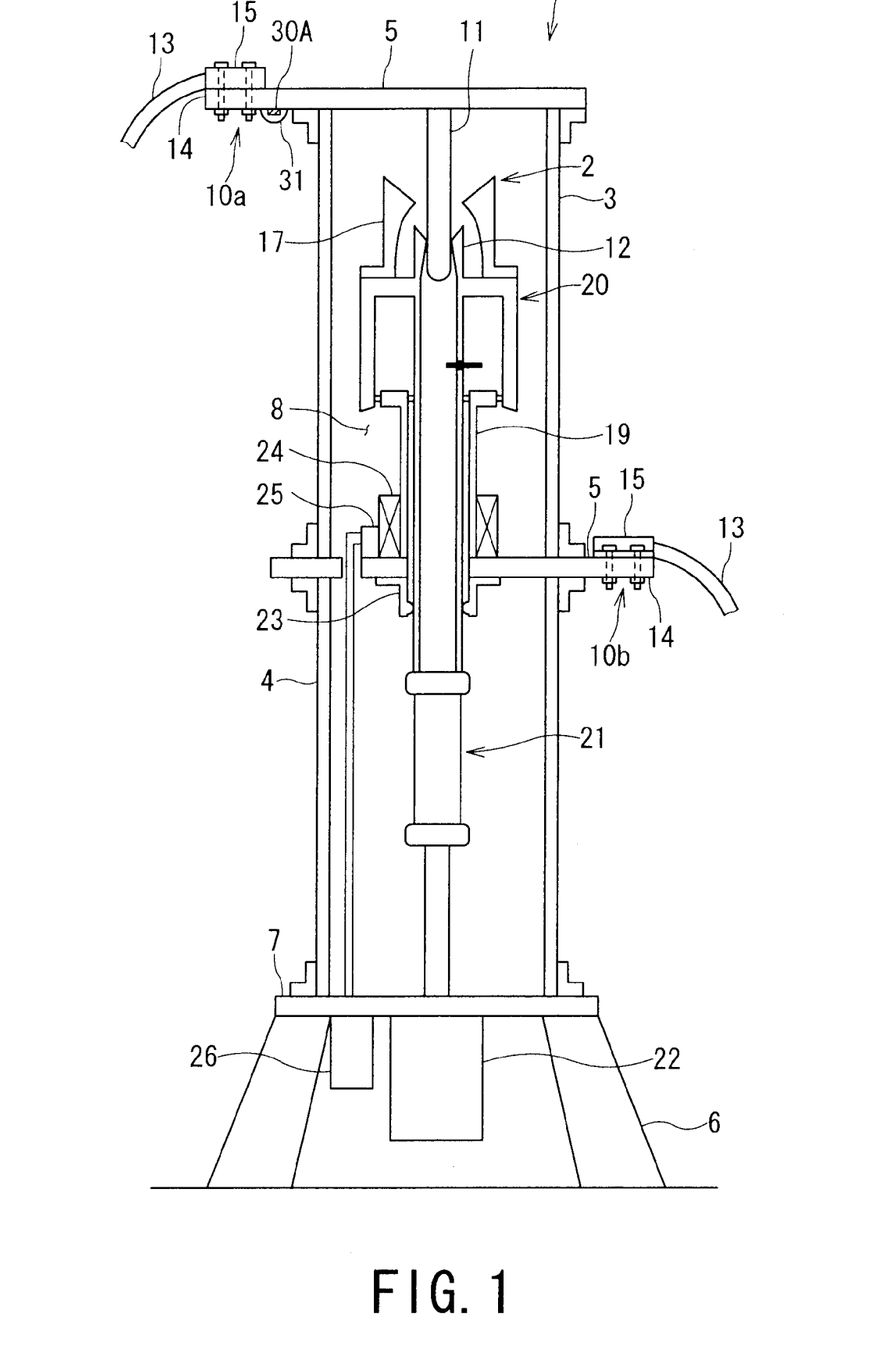
FIG. 1 is a vertical cross-sectional view of an insulator gas circuit breaker, which is an example of a high voltage equipment, provided with a temperature sensor attached IC tag according to the present invention (first embodiment of the insulator gas circuit breaker as the present invention)

FIG. 1 is a vertical cross-sectional view of a temperature sensor attached IC tag application insulator gas circuit breaker 1A that is an example of the sensor attached IC tag application high voltage equipment according to the present invention.

As illustrated in FIG. 1, in the temperature sensor attached IC tag application insulator gas circuit breaker 1 A, a container includes a nonmetal porcelain tube 3 accommodating a breaker unit (switching unit) 2, a supporting porcelain tube 4 for supporting the breaker unit 2 so as to be insulated from the ground (earth), a metal flange unit 5, and a lower part supporting member 7 which seals the supporting porcelain tube 4 and is mounted to a mount 6 is filled with an insulating gas 8 such as sulfur hexafluoride $SF_6$.

The temperature sensor attached IC tag application insulator gas circuit breaker 1A has two electrode units 10a and 10b provided to the flange unit 5. The temperature sensor attached IC tag application insulator gas circuit breaker 1A performs the switching (connection/disconnection) operation by switching between the connecting (on) and the disconnecting (off) of the electrode units 10a and 10b. To be more specific, as a fixed contact 11 provided on the flange unit 5 together with the upper electrode 10a is set closer to or separated from a movable contact 12 provided on the flange unit 5 together with the lower electrode 10b in the up and down direction, a disconnecting state and a connecting state are switched. That is, the configuration and operational principle for performing the connection/disconnection operation are similar to those of a conventional insulator gas circuit breaker.

Herein, reference numeral 13 denotes a connection lead, reference numeral 14 denotes a terminal for electrically connecting the connection lead 13 with the electrode units 10a and 10b, reference numeral 15 denotes a terminal cover for protecting the terminal 14. Further, reference numeral 17 denotes an insulating nozzle arranged so as to cover an outer periphery of the fixed contact 11, reference numeral 19 denotes an operation piston supported by the terminal 14 of the lower electrode unit 10b, reference numeral 20 denotes a buffer cylinder forming a buffer chamber to which the movable contact 12 and the insulating nozzle 17 are mounted and which is swallowed by the operation piston 19. Still further, reference numeral 21 denotes an insulating operation rod for integrally moving the movable contact 12, the insulating nozzle 17, and the buffer cylinder 20 in the up and down direction to perform the switching operation on the fixed contact 11 and the movable contact 12, reference numeral 22 denotes a switch operation mechanism, reference numeral 23 denotes a slide contact unit, reference numeral 24 denotes a CT (Current Transformer), reference numeral 25 denotes an electric/optical (E/O) transducer, and reference numeral 26 denotes an optical/electric (O/E) transducer.

As illustrated in FIG. 1, in the temperature sensor attached IC tag application insulator gas circuit breaker 1A, an active type temperature sensor attached IC tag 30A is mounted to the electrode unit 10a. Further, in the temperature sensor attached IC tag application insulator gas circuit breaker 1A, in order that a high electric field is not applied to a part to which the temperature sensor attached IC tag 30A is mounted, an electrostatic shielding member 31 is utilized to achieve the electrostatic shielding.

That is, the electrostatic shielding member 31 is mounted to an outer side of the temperature sensor attached IC tag 30A, and the temperature sensor attached IC tag 30A is covered so that a surface of the electrostatic shielding member 31 becomes smooth shape such as an egg shape. The electrostatic shielding member 31 is formed of a semiconductor material. In this manner, as the electrostatic shielding member 31 is utilized for the electrostatic shielding on the temperature sensor attached IC tag 30A, the temperature sensor attached IC tag 30A is not applied with the electric field.

The semiconductor material utilized for the electrostatic shielding member 31 has a time constant represented by a product of an electric resistivity and a dielectric constant is equal to or lower than $1/10^6$ second (micro second) so that the semiconductor material shows a sufficiently metallic characteristic to an electromagnetic wave of 1 MHz which is utilized as a commercial frequency or generated by the thunder. It should be noted that the time constant of the semiconductor material is equal to or larger than an inverse number of the communication frequency in order that the frequency utilized for the communication of the temperature sensor attached IC tag 30A (communication frequency) can transmit therethrough.

For example, if the frequency used for the communication of the temperature sensor attached IC tag 30A is 1 GHz, the time constant of the semiconductor material used for the electrostatic shielding member 31 is set to $1/10^9$ second (nano second) or larger but $1/10^6$ second or smaller. In other words, a semiconductor material, in which an inverse number of the time constant is 1 MHz or larger but 1 GHz or smaller, is utilized for the electrostatic shielding member 31.

As a result of covering the temperature sensor attached IC tag 30A with the electrostatic shielding member 31 which is formed of the semiconductor material having a characteristic as mentioned above, it is possible to prevent the high electric field from being applied to the temperature sensor attached IC tag 30A and the temperature sensor attached IC tag 30A is possible to communicate with the IC tag reader located outside a space shielded by the electrostatic shielding member 31 without disturbing the communication with the IC tag reader. That is, even in a situation where a voltage of a commercial frequency or a lightning surge (which means a surge voltage generated by the thunder) enters into the line, no negative influences are affected on the communication with the IC tag reader. In addition, it is possible to suppress a destruction of the temperature sensor attached IC tag 30A and a partial discharge generated in the vicinity of temperature sensor attached IC tag 30A.

Figure 2:
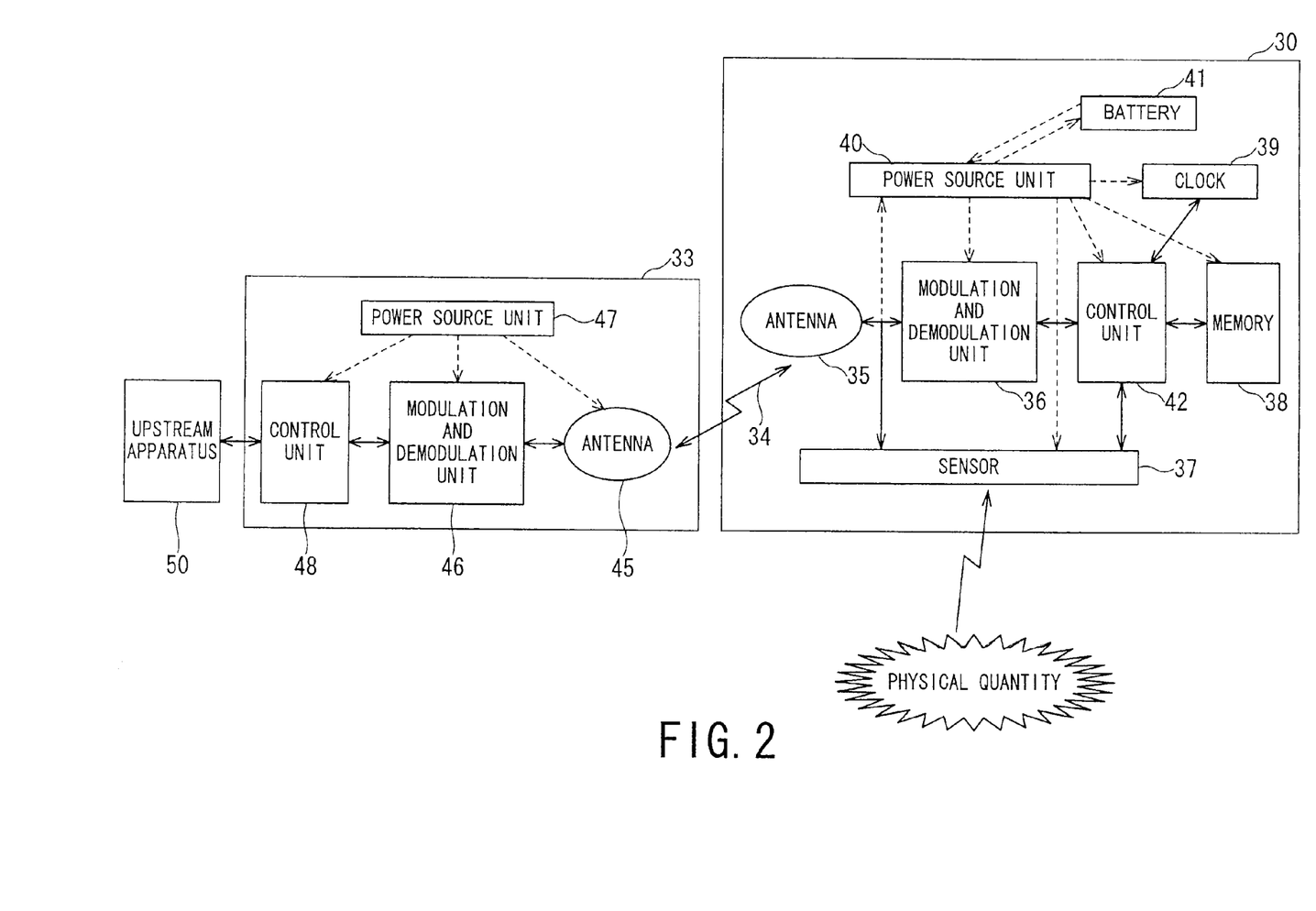
FIG. 2 is a schematic diagram of a configuration outline of a sensor attached IC tag provided to the high voltage equipment according to the present invention and an IC tag reader-writer which performs wireless communication with the sensor attached IC tag provided to the high voltage equipment.

FIG. 2 is a schematic diagram illustrating configuration diagrams of a sensor attached IC tag 30 of the sensor attached IC tag application high voltage equipment according to the present invention and an IC tag reader-writer 33 which performs a wireless communication with the sensor attached IC tag 30 to read information from the sensor attached IC tag 30 or write information to the sensor attached IC tag 30. It should be noted that in the IC tag 30, solid lines illustrated in the IC tag reader-writer 33 represent flows of information and broken lines represent flows of energy.

As illustrated in FIG. 2, the sensor attached IC tag 30 is provided with an antenna 35 for transmitting and receiving an electromagnetic wave including a signal or information (hereinafter simply referred to as "communication signal") 34 for the communication with the IC tag reader-writer 33, a modulation and demodulation unit 36 for performing modulation and demodulation on the electromagnetic wave received via the antenna 35, a sensor 37 for detecting and obtaining a physical quantity of a detection target, a memory 38 for storing information obtained by the sensor 37, a clock 39 having a built-in timer, a power source unit 40 for supplying operation electric power, a battery 41 for supplying electric power to the power source unit 40, and a control unit 42 for controlling the sensor attached IC tag 30.

The modulation and demodulation unit 36 has functions of performing an appropriate conversion such as recording and transmission with respect to the transmitting and receiving signal 34 (a modulation function and a demodulation function) as well as a filter function for the communication signal 34, whereby it is possible to remove the noise component superposed on the communication signal 34. The memory 38 is, for example, a memory medium composed of a non-volatile memory. The control unit 42 has, for example, information necessary to control information storage procedure of the memory 38 or the like and performs a computation process.

It should be noted that the sensor attached IC tag 30 adopts an active type IC tag having the built-in battery 41, for example. Therefore, before the battery 41 is consumed up, the sensor attached IC tag 30 itself is assumed to be replaced by a new IC tag on a periodic basis. In usual cases, such a configuration is adopted if the reading signal 34 is not received from the IC tag reader-writer 33, and the information such as the measurement result is not transmitted.

On the other hand, the IC tag reader-writer 33 is provided with an antenna 45 for transmitting and receiving the communication signal 34 with the sensor attached IC tag 30, a modulation and demodulation unit 46 for performing modulation and demodulation on the electromagnetic wave received via the antenna 45, a power source unit 47 for supplying operation electric power, and a control unit 48 for controlling the IC tag reader-writer 33.

It should be noted that the sensor attached IC tag 30 and the IC tag reader-writer 33 perform frequency modulation or digital modulation on the electromagnetic wave to transmit and receive various signals such as data read out instruction signal and measurement results. This configuration is adopted to facilitate the distinction between the noise due to the partial discharge or the like and the necessary signal or information.

In addition, the antenna 45, the modulation and demodulation unit 46, the power source unit 47, and the control unit 48 of the IC tag reader-writer 33 are components performing substantially the same operation as those of the antenna 35, the modulation and demodulation unit 36, the power source unit 40, and the control unit 42 of the sensor attached IC tag 30.

When the IC tag reader-writer 33 transmits the read signal serving as communication signal 34 from to the sensor attached IC tag 30, the IC tag reader-writer 33 performs the wireless communication with the sensor attached IC tag 30 and thus can read the information from the memory 38 of the sensor attached IC tag 30. Further, when the IC tag reader-writer 33 transmits the write signal serving as communication signal 34 from to the sensor attached IC tag 30, the IC tag reader-writer 33 can write the information to the memory 38 of the sensor attached IC tag 30. That is, the IC tag reader-writer 33 has both a function as an IC tag reader to read the information from the IC tag 30 and a function as an IC tag writer to write the information to the sensor attached IC tag 30.

The measurement data received by the IC tag reader-writer 33 from the sensor attached IC tag 30 is input to an upstream apparatus 50 such as a computer via a cable or a portable storage memory.

Figure 3:
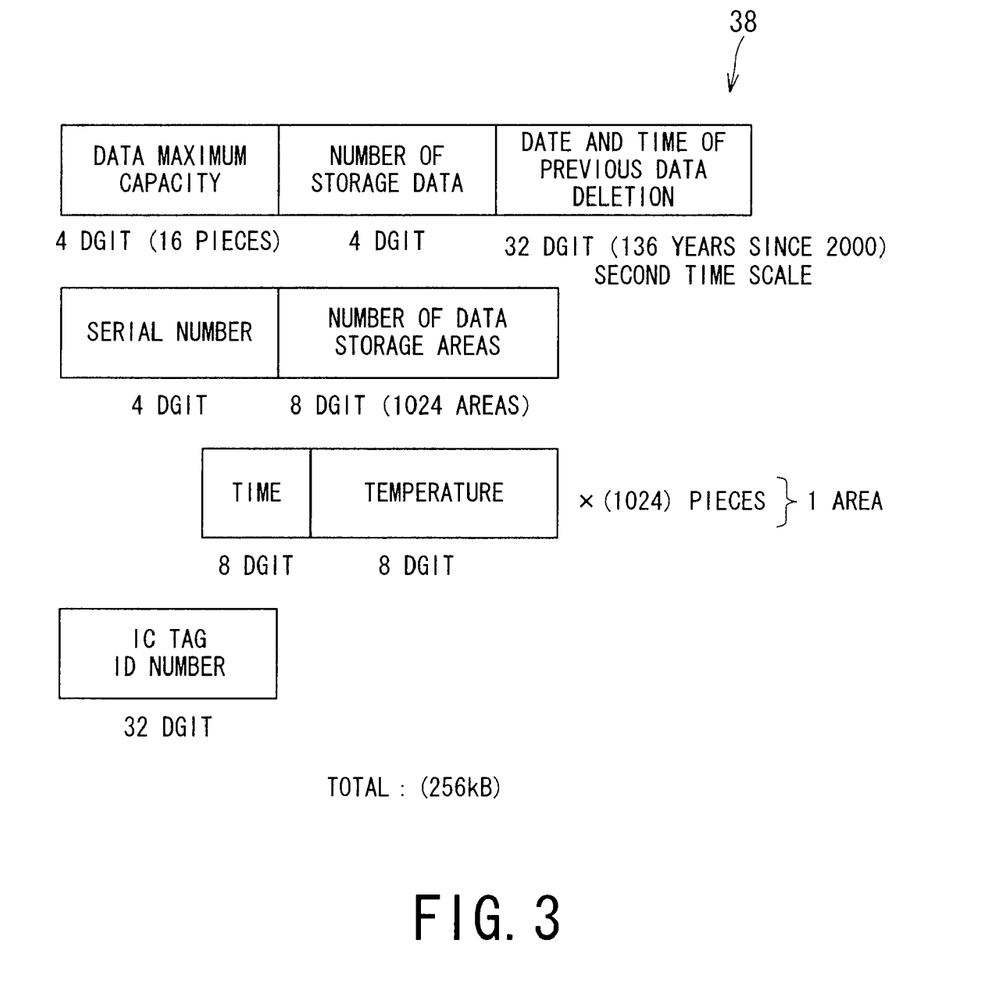
FIG. 3 is an explanatory diagram for describing an example of an information configuration stored in a memory of the sensor attached IC tag provided to the high voltage equipment according to the present invention.

FIG. 3 is an explanatory diagram for describing an example of an information configuration stored in the memory 38 of the sensor attached IC tag 30.

Examples of information stored in the memory 38 include, as illustrated in FIG. 3, data maximum capacity, the number of storage data, date and time of previous data deletion, a serial number (No.), the number of data storage areas (for example, 1024 areas), and identification information on the IC tag (an ID number of the IC tag).

For example, in the case of the memory the memory 38 of the temperature sensor attached IC tag 30A illustrated in FIG. 1, the storage is performed in such a manner that the temperature sensor is associated with one serial number, and the result of the temperature measurement at one data storage area corresponding to this serial number is associated with one serial number. In a case of the memory 38 illustrated in FIG. 3, as 1024 measurement results can be stored in one data storage area, it is possible to store data pieces of 1024 areas× 1024 pieces if all the data storage areas are utilized.

Next, a description will be given of the actions of the temperature sensor attached IC tag application insulator gas circuit breaker 1A.

First, when the contact part becomes conductive due to the switching operation of the breaker 1A, a current I flows into the electrode units 10a and 10b (electric resistance R) connecting the breaker 1A with another equipment. Then, an ohmic loss (resistive loss) $RI^2$ is caused, a temperature of the electrode units 10a and 10b is increased. As illustrated in FIG. 1, in the temperature sensor attached IC tag application insulator gas circuit breaker 1A, the temperature sensor attached IC tag 30A is mounted to the electrode unit 10a. Therefore, the temperature sensor attached IC tag 30A measures and obtains the temperature of the electrode unit 10a.

In the temperature sensor attached IC tag 30A, as illustrated in FIG. 2, the control unit 42 controls the memory 38 to store the temperature information detected by the sensor 37 at regular time intervals through the operation with a built-in timer of the clock 39 in the memory 38 together with time information (for example, a clock time).

Herein, if the memory capacity is exceeded when the information on the thus obtained physical quantities is stored as a result of the storage of the measurement results in the memory 38, the control unit 42 controls the memory 38 to store the information on the physical quantities in accordance with previously determined certain rules. For example, in a case where 1024 (maximum number) temperature measurement results are stored, the control unit 42 performs such a control that the oldest temperature measurement result in the data storage area for the temperature measurement results is deleted and a new temperature measurement result is stored.

As in the example of FIG. 3, when IC tag identification information (an ID number of the IC tag) is stored in the memory 38, the IC tag reader-writer 33 permits the read or write of the physical quantity (the information of the measurement result) stored in the memory 38 on condition that one or both of the identification information of the IC tag identification information and the identification information of the IC tag reader-writer 33 are matched.

That is, when the IC tag reader-writer 33 supplies the electromagnetic wave serving as a high frequency signal (communication signal) 34 from an outside of the temperature sensor attached IC tag application insulator gas circuit breaker 1A to the temperature sensor attached IC tag 30A, the information transmission and reception with the IC tag reader-writer 33 can be performed. In this manner, as it is possible to obtain the information of the temperature measurement result stored in the memory 38 of the temperature sensor attached IC tag 30A by performing a remote operation for transmitting the communication signal 34 from a remote place, a user can measure the temperature and monitor the temperature sensor attached IC tag application insulator gas circuit breaker 1A without changing the state of the temperature sensor attached IC tag application insulator gas circuit breaker 1A.

According to the temperature sensor attached IC tag application insulator gas circuit breaker 1A, when the increase in the resistance value (the increase in the ohmic loss) due to rust or slackness of the electrode units 10a and 10b is found out by performing the monitoring on the temperature of the electrode units 10a and 10b in the switching operation, even in the high voltage hot line state, it is possible to read out the measurement results by using the IC tag reader from a place away from a critical distance (which means a distance where an electrical shock or an insulation destruction is generated) or longer. Therefore, a risk of giving the electrical shock to an inspector (user) or the like is eliminated and the safety can be increased as compared with the conventional technology.

Further, according to the temperature sensor attached IC tag application insulator gas circuit breaker 1A, in the sensor attached IC tag 30, if data obtained by superposing time information on the electromagnetic wave for the data communication irradiated from the IC tag reader-writer 33 to the sensor attached IC tag 30 is transmitted as the communication signal 34, the control unit 42 can recognize the time information received via the antenna 35 and the modulation and demodulation unit 36 to generate a signal for correcting the clock 39 and transmit the signal to the clock 39. Therefore, each time the information read or write is performed at the IC tag reader-writer 33, the time recognized by the clock 39 can be corrected to the accurate time.

Furthermore, as the electromagnetic waves for the communication signal 34 such as the start instruction signal from the IC tag reader-writer 33 at the read time to the sensor attached IC tag 30 and the data from the sensor attached IC tag 30 to the IC tag reader-writer 33 are subjected to the frequency modulation or the digital modulation, the distinction between the noise due to the partial discharge or the like and the necessary signal or information can be facilitated.

Next, a description will be given of another example of the temperature sensor attached IC tag application insulator gas circuit breaker 1A. It should be noted that the same reference numerals are allocated to components substantially similar to those of the temperature sensor attached IC tag application insulator gas circuit breaker 1A and the descriptions thereof will omitted.

Figure 4:
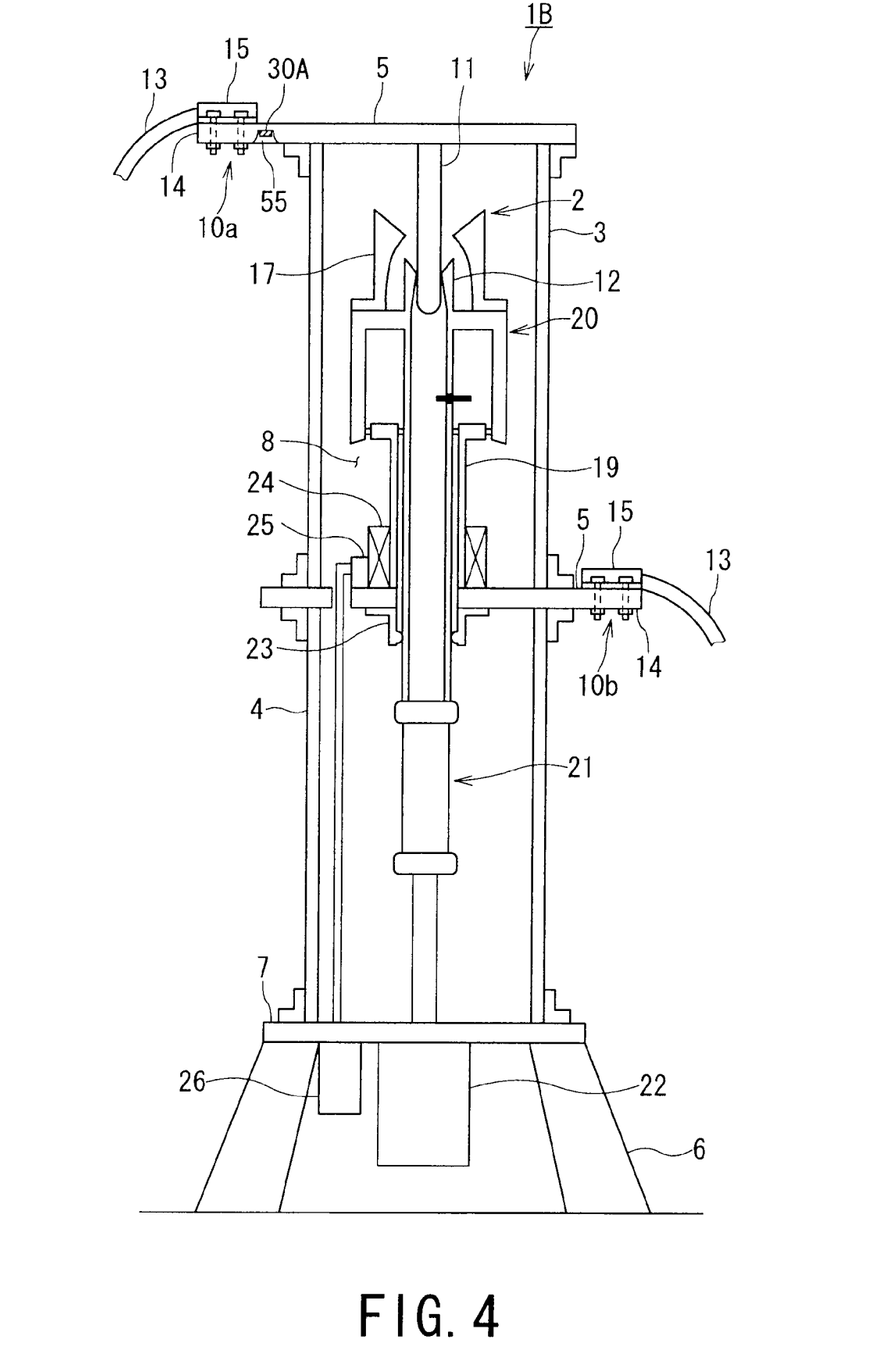
FIG. 4 is a vertical cross-sectional view of an insulator gas circuit breaker, which is an example of a high voltage equipment, provided with a temperature sensor attached IC tag according to the present invention (second embodiment of the insulator gas circuit breaker as the present invention)

FIG. 4 is a vertical cross-sectional view of a temperature sensor attached IC tag application insulator gas circuit breaker 1B according to another example (second embodiment) of the present invention.

In the temperature sensor attached IC tag application insulator gas circuit breaker 1B illustrated in FIG. 4, a mounting hole 55 formed into a groove shape for mounting the temperature sensor attached IC tag 30A is provided to the electrode unit 10a. Then, the temperature sensor attached IC tag 30A is detachably mounted to the mounting hole 55. Further, as illustrated in FIG. 4, in the temperature sensor attached IC tag application insulator gas circuit breaker 1B, the electrostatic shielding member 31 is not mounted, and the temperature sensor attached IC tag 30A does not have the electrostatic shield by the electrostatic shielding member 31.

According to the temperature sensor attached IC tag application insulator gas circuit breaker 1B, even when a high voltage is applied to the breaker unit 2 during the closing (connecting) operation through the mounting of the temperature sensor attached IC tag 30A to the mounting hole 55, it is possible to prevent the high electric field from being applied to the antenna 35 of the temperature sensor attached IC tag 30A. Therefore, the generation of the partial discharge starting from the antenna 35 of the temperature sensor attached IC tag 30A can be avoided.

In addition, as the electromagnetic wave serving as the communication signal 34 can be propagated through the mounting hole 55, the temperature sensor attached IC tag 30A can perform the communication with the IC tag reader-writer 33 located outside of the temperature sensor attached IC tag application insulator gas circuit breaker 1B. It should be noted that other effects are similar to those of the above-mentioned case of the temperature sensor attached IC tag application insulator gas circuit breaker 1A.

Figure 5:
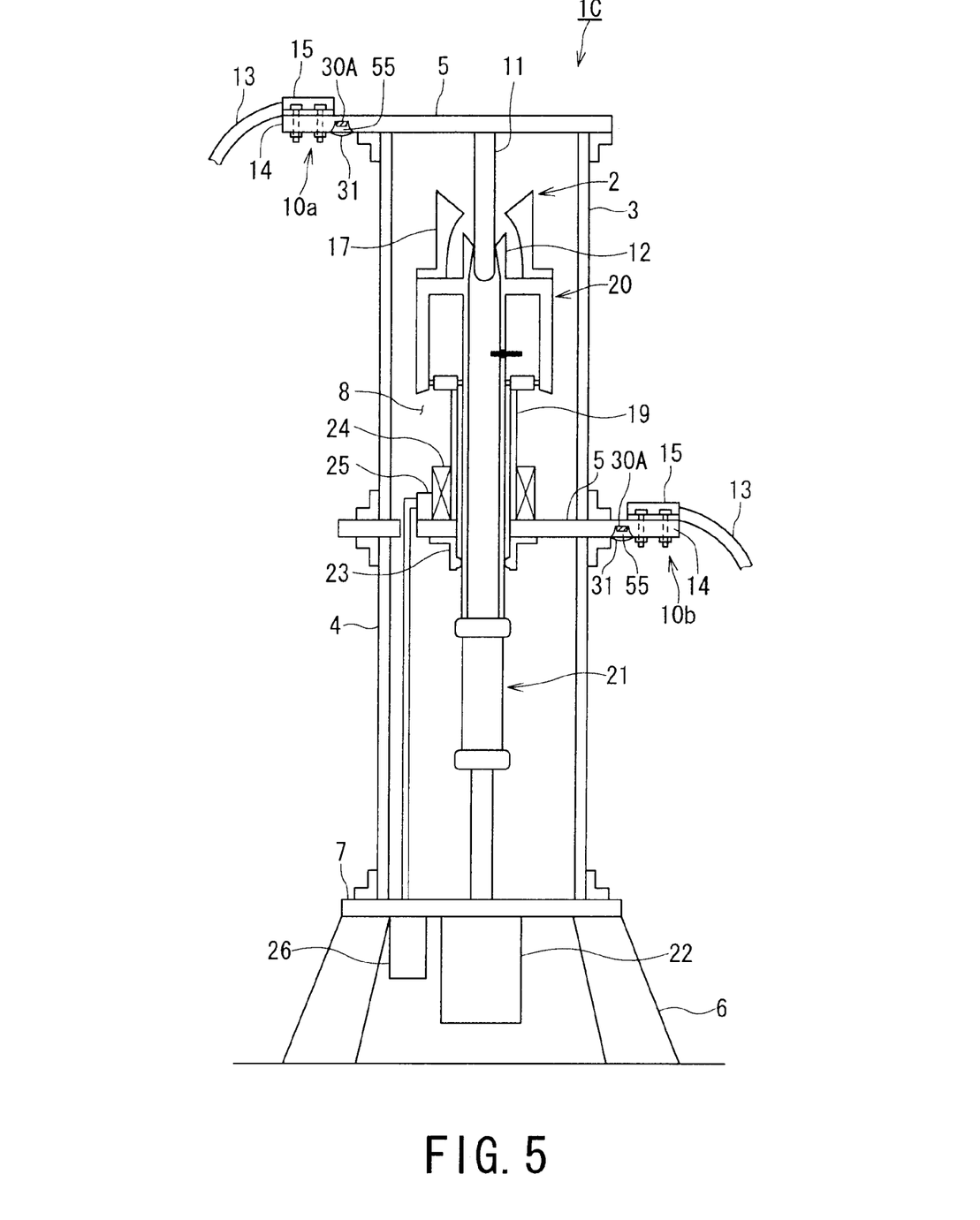
FIG. 5 is a vertical cross-sectional view of a an insulator gas circuit breaker, which is an example of a high voltage equipment, provided with a temperature sensor attached IC tag according to the present invention (third embodiment of the insulator gas circuit breaker as the present invention)

FIG. 5 is a vertical cross-sectional view of a temperature sensor attached IC tag application insulator gas circuit breaker 1C according to another example (third embodiment) of the present invention.

As illustrated in FIG. 5, in the temperature sensor attached IC tag application insulator gas circuit breaker 1C, the mounting hole 55 of the temperature sensor attached IC tag application insulator gas circuit breaker 1B is provided to the lower electrode unit 10b as well. Further, the temperature sensor attached IC tag application insulator gas circuit breaker 1C is constructed in such a manner that the electrostatic shielding member 31 is mounted in the vicinity of the entrance of the mounting hole 55 so that the temperature sensor attached IC tag 30A is covered and the mounting hole 55 is clogged.

According to the temperature sensor attached IC tag application insulator gas circuit breaker 1C, the temperature sensor attached IC tag 30A is physically covered by the electrostatic shielding member 31 to effect the electrostatic shielding, and therefore a higher electrostatic shielding effect is expected as compared with the temperature sensor attached IC tag application insulator gas circuit breaker 1B. It should be noted that other effects are similar to those of the case of the temperature sensor attached IC tag application insulator gas circuit breaker 1B.

Figure 6:
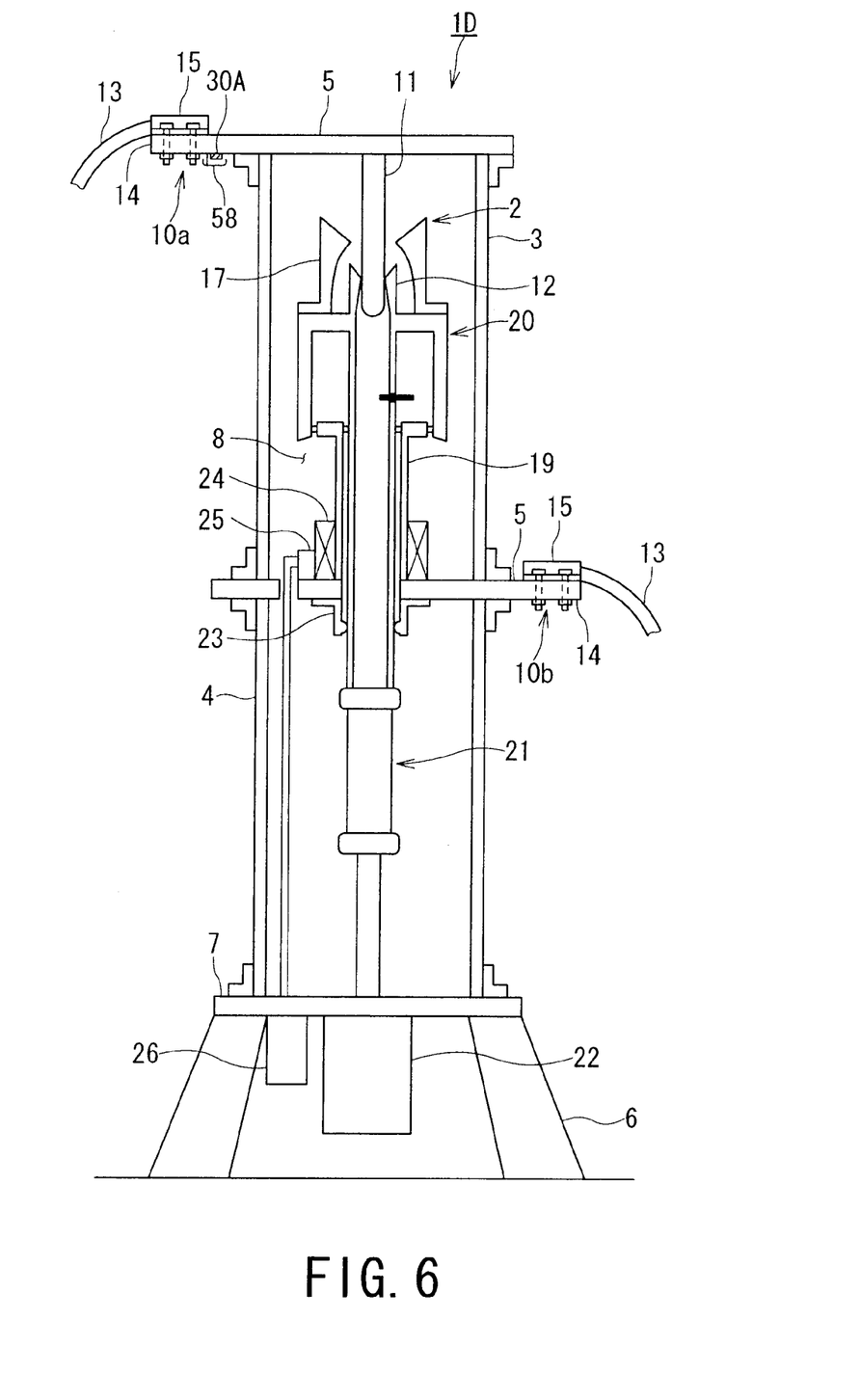
FIG. 6 is a vertical cross-sectional view of an insulator gas circuit breaker, which is an example of a high voltage equipment, provided with a temperature sensor attached IC tag according to the present invention (fourth embodiment of the insulator gas circuit breaker as the present invention)

FIG. 6 is a vertical cross-sectional view of a temperature sensor attached IC tag application insulator gas circuit breaker 1D according to another example (fourth embodiment) of the present invention.

In comparison to the temperature sensor attached IC tag application insulator gas circuit breaker 1A illustrated in FIG. 1, the temperature sensor attached IC tag application insulator gas circuit breaker 1D is constructed in such a manner that instead of using the electrostatic shielding member 31, the temperature sensor attached IC tag 30A is covered with an electrostatic shielding member 58 processed into a special shape for the electrostatic shielding.

The electrostatic shielding member 58 is made of a metal and constructed so that, as illustrated in FIG. 6, its distal end is processed to be rounded. Further, the electrostatic shielding member 58 is mounted to the upper electrode unit 10a with a clearance with respect to the upper electrode unit 10a.

According to the temperature sensor attached IC tag application insulator gas circuit breaker 1D, as illustrated in FIG. 6, while the temperature sensor attached IC tag 30A is covered with the metal electrostatic shielding member 58 processed into the special shape, even in a state where a voltage of a commercial frequency or lightning surge enters into the line, it is possible to prevent a high electric field from being applied to the temperature sensor attached IC tag 30A. Therefore, the destruction of the temperature sensor attached IC tag 30A and the generation of the partial discharge starting from the antenna 35 of the temperature sensor attached IC tag 30A can be avoided.

In addition, the electric wave can be propagated through the clearance between the electrostatic shielding member 58 and the upper electrode unit 10a, the temperature sensor attached IC tag 30A can communicate with the IC tag reader-writer 33 located outside the temperature sensor attached IC tag application insulator gas circuit breaker 1D.

As described above, according to the present invention, the sensor attached IC tag 30 detachably mounted in the present invention can transmit sensor output results serving as the measurement result stored in the memory 38 to the IC tag reader when the read out signal is received from the IC tag reader. Alternatively, upon receiving the read out signal from the IC tag reader, the sensor attached IC tag 30 detachably mounted in the present invention can transmit the information, detected the sensor output results and then stored the sensor output results with the time information in the memory 38 at certain time interval, to the IC tag reader. Thus, the risk of giving the electrical shock to the inspector (user) or the like is eliminated and the safety can be increased as compared with the conventional technology. In addition, the inspection time and the inspection costs can be reduced.

Furthermore, the information where the progress data on the temperature or the partial discharge recorded up until this time point by the sensor attached IC tag 30 and stored in the memory 38 can be transmitted to the IC tag reader, and therefore the change in the electric contact state at the contact part can be checked during the routine inspections.

Moreover, by using the sensor attached IC tag 30 additionally having a temperature sensor for measuring an atmospheric temperature in addition to the temperature sensor for measuring the temperature of the electrode unit 10a, the temperature rise state can be determined on the basis of comparison with the two temperature sensors and the time series comparison can be performed. From this comparison result, as it is possible to understand whether the change is suddenly or gradually developed, the abnormal state can be diagnosed in detail. It should be noted that these pieces of information are transmitted and received by way of the electric waves, and even when the sensor is covered with the insulating member through which the electric waves transmit, the transmission of the measurement results of the temperature or the partial discharge can be performed.

On the other hand, when a sensor for measuring the partial discharge is mounted as the sensor of the sensor attached IC tag 30, unlike the conventional technology, a large scale apparatus does not need to be externally mounted for measuring the partial discharge, and the partial discharge measurement can be facilitated. Further, as the partial discharge can be measured at a large number of points at the same time, the partial discharge generation position can be easily identified by performing the switching operation.

It should be noted that according to the above description, the case where the sensor attached IC tag application high voltage equipment according to the present invention is the temperature sensor attached IC tag application insulator gas circuit breaker 1A has been described, but a plurality of the sensor of the sensor attached IC tags of the same type may be mounted in some cases as illustrated in FIG. 5. In addition, the sensor may include the partial discharge alone or both the temperature sensors and the partial discharge.

According to the above description, the case of the active type in which the sensor attached IC tag 30 is provided with the battery 41 has been described, but such a case is also considerable that instead of using the battery 41, a large volume capacitor such as a high speed chargeable accumulator battery (rechargeable battery) or an electric double layer capacitor is used. When the sensor attached IC tag 30 is provided with the accumulator battery or the like, the charging can be performed through the periodic irradiation of the electromagnetic wave, and therefore it is possible to obtain the similar actions and effects to those of the active type in which the sensor attached IC tag 30 is provided with the battery 41.

Figure 7:
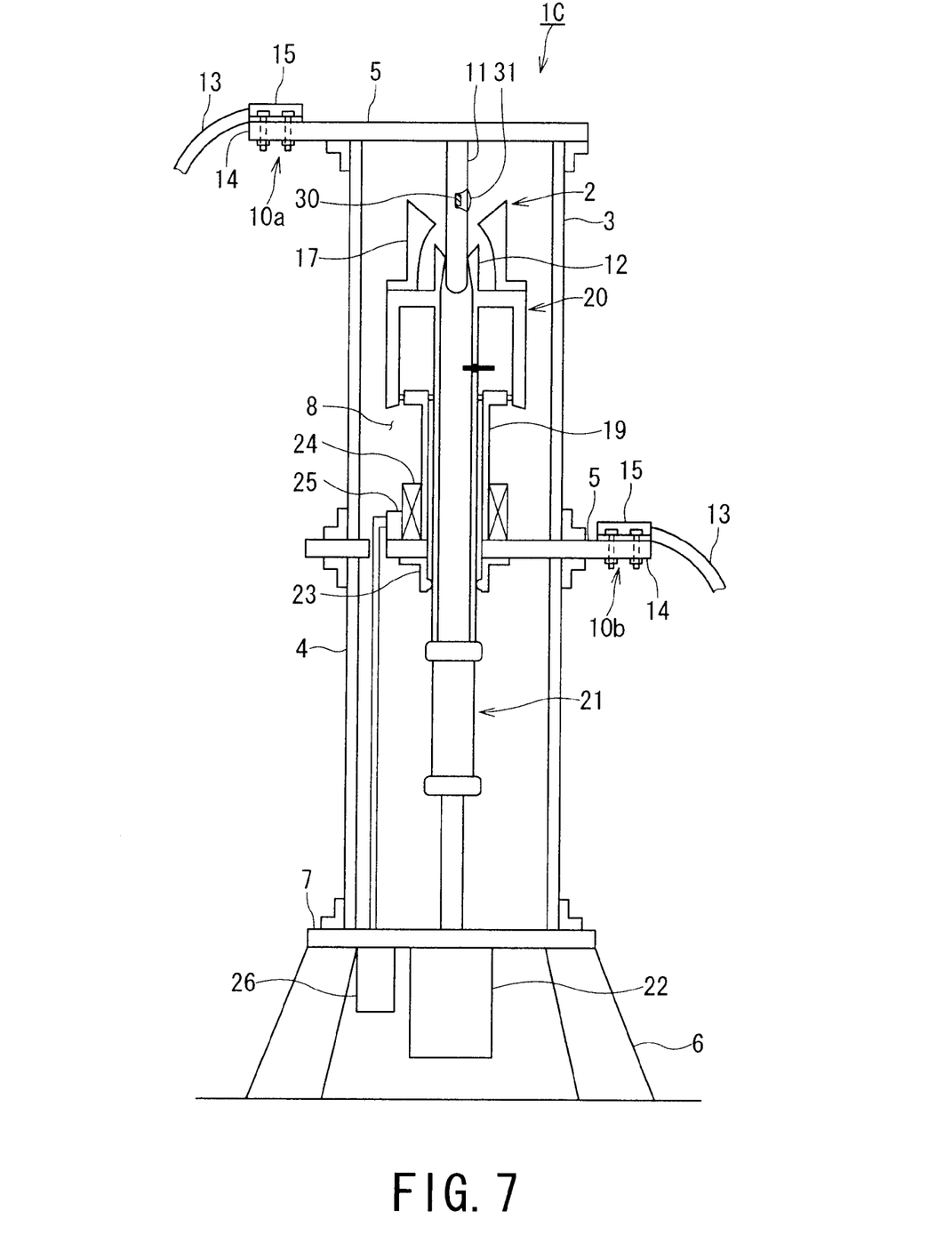
FIG. 7 is a vertical cross-sectional view of an insulator gas circuit breaker, which is an example of a high voltage equipment, provided with a temperature sensor attached IC tag according to the present invention (fifth embodiment of the insulator gas circuit breaker as the present invention)
Figure 8:
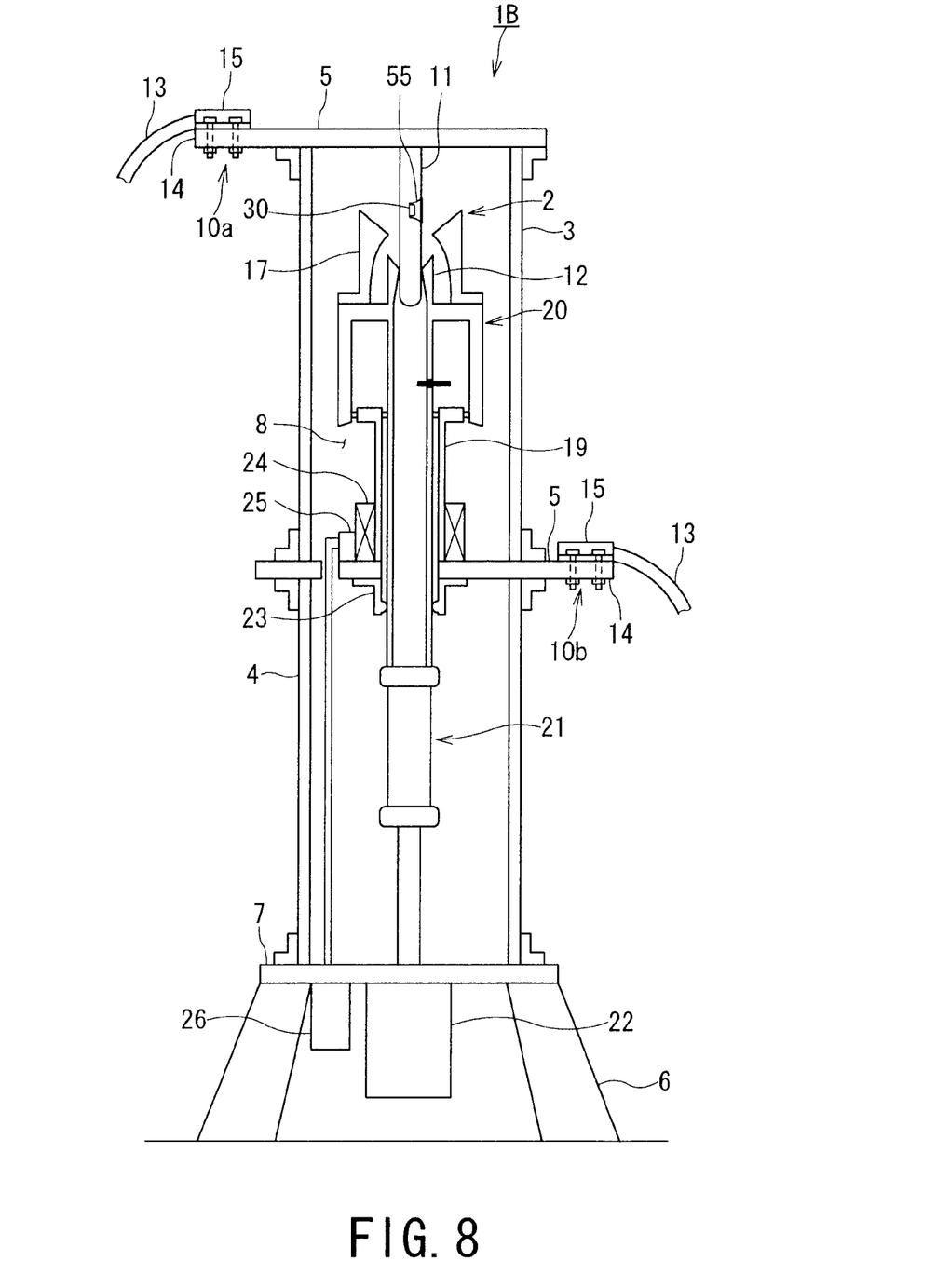
FIG. 8 is a vertical cross-sectional view of an insulator gas circuit breaker, which is an example of a high voltage equipment, provided with a temperature sensor attached IC tag according to the present invention (sixth embodiment of the insulator gas circuit breaker as the present invention)
Figure 9:
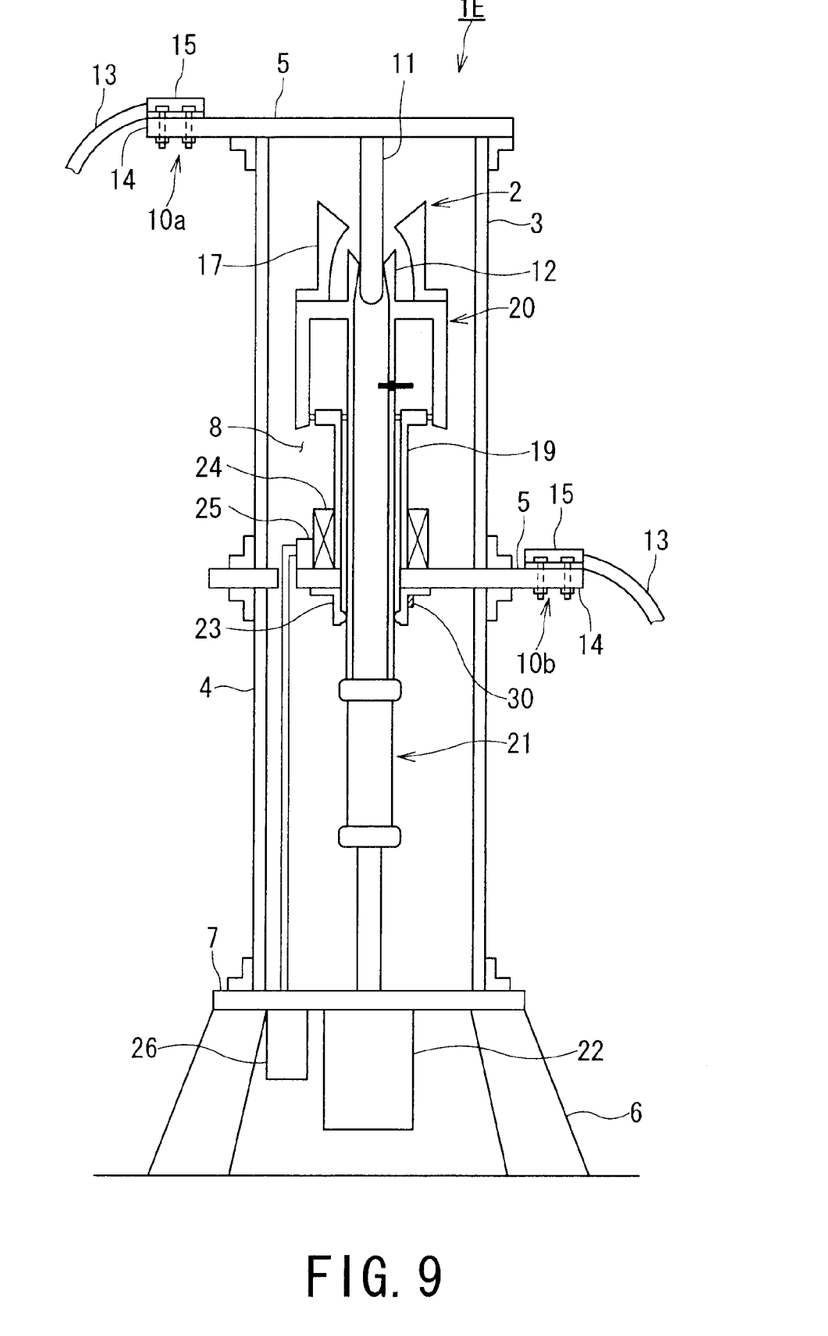
FIG. 9 is a vertical cross-sectional view of an insulator gas circuit breaker, which is an example of a high voltage equipment, provided with a temperature sensor attached IC tag according to the present invention (seventh embodiment of the insulator gas circuit breaker as the present invention)

In addition, the mounting position of the sensor attached IC tag 30A may be different from the position illustrated in FIG. 1 in some cases, but the similar effects are obtained. More specifically, the similar effects can be obtained even in a case where the sensor attached IC tag 30A is mounted to the lower electrode unit 10b as illustrated in FIG. 5, a case where the sensor attached IC tag 30A is mounted to the fixed contact 11 as the high voltage unit (fifth and sixth embodiments) as illustrated in FIGS. 7 and 8, and a case where the sensor attached IC tag 30A is mounted to the slide contact unit 23 as the high voltage unit (seventh embodiment) as illustrated in FIG. 9 (which shows the temperature sensor attached IC tag application insulator gas circuit breaker IC 1E). Here, the temperature sensor attached IC tag application insulator gas circuit breaker 1C illustrated in FIG. 7 is a fifth embodiment of the temperature sensor attached IC tag application insulator gas circuit breaker according to the present invention. Further, the temperature sensor attached IC tag application insulator gas circuit breaker 1B illustrated in FIG. 8 is a sixth embodiment of the temperature sensor attached IC tag application insulator gas circuit breaker.

Furthermore, such a case is also considerable that the sensor attached IC tag application high voltage equipment is a disconnecting switch. The actions and effects are similar to those in the case of the temperature sensor attached IC tag application insulator gas circuit breaker 1A.

On the other hand, the sensor attached IC tag application high voltage equipment may be a high voltage equipment for an electric power which is not provided with the switching unit 2 for performing the electric path switching. However, the similar actions and effects to those of the temperature sensor attached IC tag application insulator gas circuit breaker 1A can be obtained, for example, in a case where the sensor attached IC tag application high voltage equipment is a current extraction apparatus of the gas insulation bus (bushing) 1F (first and second embodiments) as illustrated in FIGS. 10 and 11 and in a case where the sensor attached IC tag application high voltage equipment is a lightning arrester 1G having a lightning arrester element 60 that is a nonlinear resistor element arranged in the porcelain tube 3 as illustrated in FIG. 12.

Figure 10:
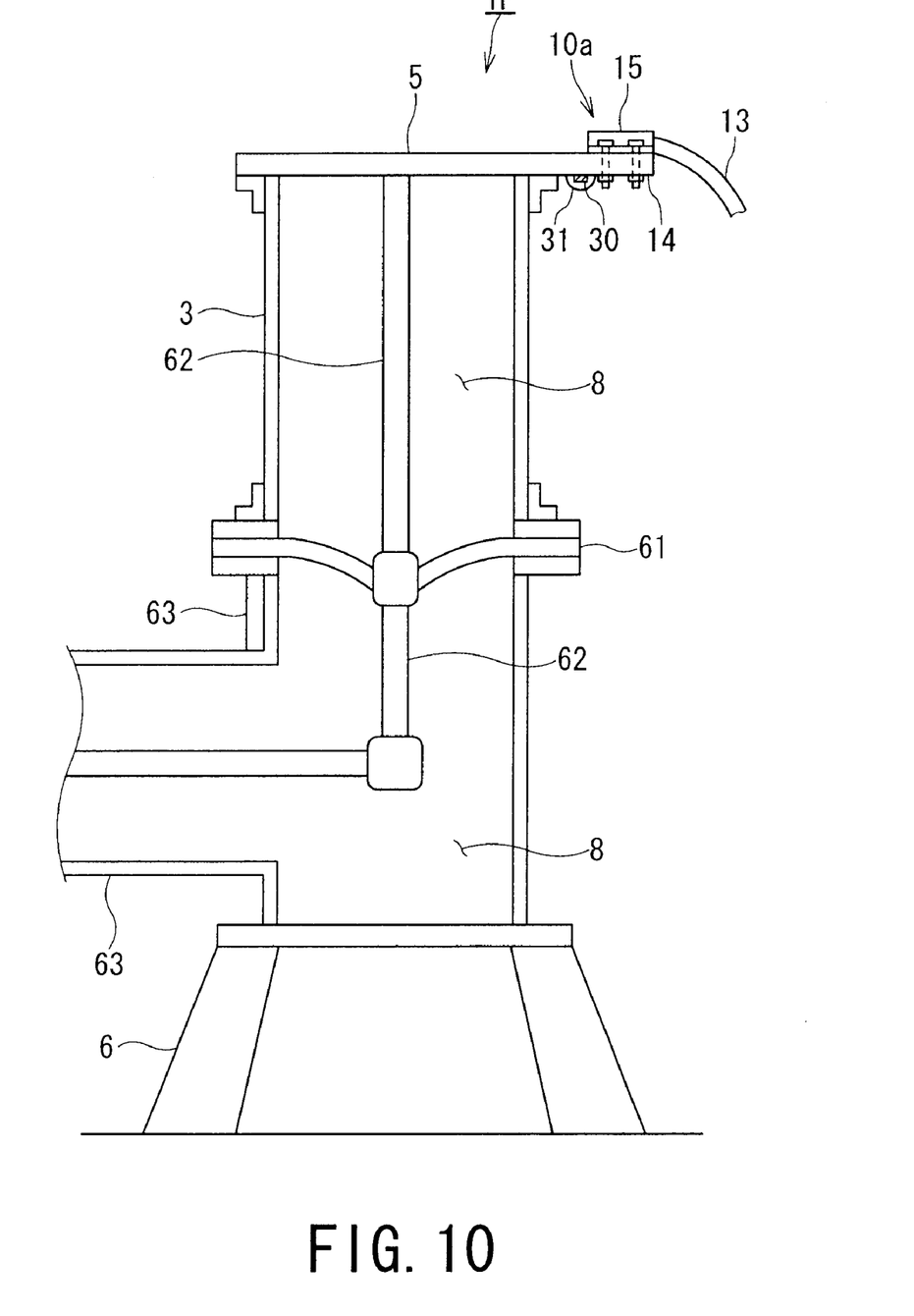
FIG. 10 is a vertical cross-sectional view of a bushing, which is another example of the high voltage equipment, provided with a sensor attached IC tag according to the present invention (first embodiment of the bushing as the present invention)
Figure 11:
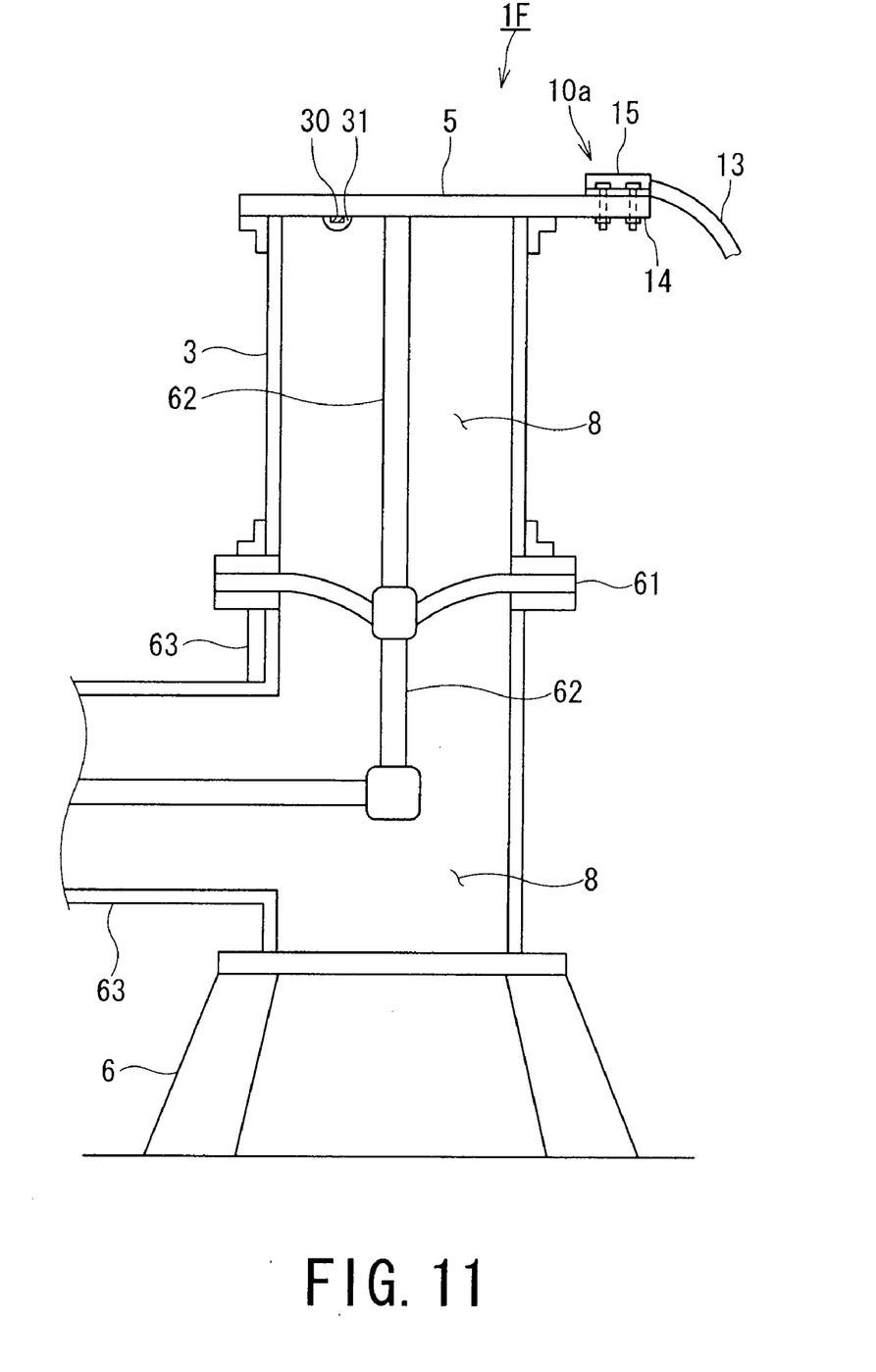
FIG. 11 is a vertical cross-sectional view of a bushing, which is another example of the high voltage equipment, provided with a sensor attached IC tag according to the present invention (second embodiment of the bushing as the present invention)
Figure 12:
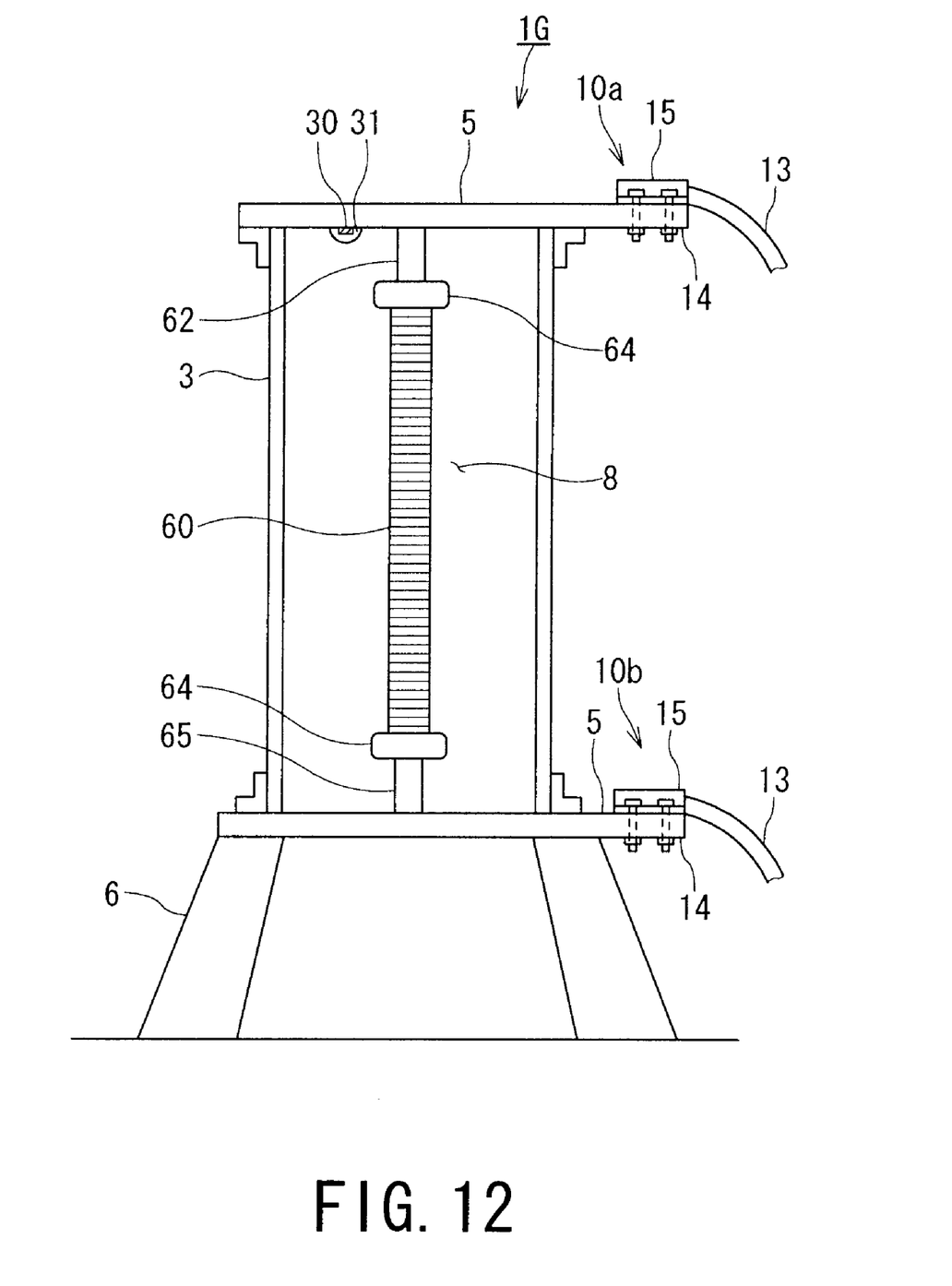
FIG. 12 is a vertical cross-sectional view of a lightning arrester, which is another example of the high voltage equipment, provided with a sensor attached IC tag according to the present invention.

Herein, in FIGS. 10 and 11, reference numeral 61 denotes an insulating spacer, reference numeral 62 denotes a high voltage conductor, and reference numeral 63 denotes a metal sealed tank. Further, in FIG. 12, reference numeral 64 denotes an electrostatic shielding member and reference numeral 65 denotes a grounded conductor.

It should be noted that according to the present invention, the write to the sensor attached IC tag 30 may not necessarily be performed. Therefore, the IC tag reader-writer 33 may be an IC tag reader that only reads out the information stored in the sensor attached IC tag 30.

Moreover, the present invention is not limited to the disclosed exemplary embodiments, and the components can be changed and embodied without departing the gist in the embodiment stages. That is, various inventions may be formed by appropriately combining some components disclosed in the respective embodiments or deleting some components from all the disclosed components.

What is claimed is:

1. A sensor attached IC tag application high voltage equipment, comprising:
   a container filled with an insulating gas;
   a high voltage unit provided inside the container; and
   a sensor attached IC tag detachably mounted to a position where a sensor of the sensor attached IC tag senses a characteristic of a detection target of the high voltage unit, wherein the sensor attached IC tag is configured to communicate with an IC tag reader located outside the sensor attached IC tag application high voltage equipment,
   wherein the sensor attached IC tag is covered with a semiconductor material separate from the sensor attached IC tag having an electric time constant in which an inverse number of the electric time constant is larger than 1 MHz and the inverse number of the electric time constant is smaller than a communication frequency of the sensor attached IC tag such that the sensor attached IC tag communicates through the semiconductor material, and the semiconductor material protects the sensor attached IC tag from electrical discharges generated by the high voltage unit and electrical discharges occurring near the sensor attached IC tag.

2. The sensor attached IC tag application high voltage equipment according to claim 1, wherein the high voltage equipment is any one of a circuit breaker having a contact point for switching an electric connection state of the high voltage unit and a disconnecting switch, a lightning arrester having a non-linear resistor element in the container, and a bushing having a conductor which is supported by an insulator in the container and achieves an electric connection with an external equipment.

3. The sensor attached IC tag application high voltage equipment according to claim 1, wherein the sensor attached IC tag is mounted to at least one of an electrode unit which is electrically connected to a connection lead of another apparatus and the high voltage unit in the container.

4. The sensor attached IC tag application high voltage equipment according to claim 3, wherein a mounting hole formed into a groove shape is provided to at least one of the electrode unit electrically connected to the connection lead of the other apparatus and the high voltage unit in the container, and the sensor attached IC tag is detachably mounted to the mounting hole.

5. The sensor attached IC tag application high voltage equipment according to claim 1, wherein the sensor attached IC tag is provided with a memory for recording a measurement result obtained by the sensor of the sensor attached IC tag.

6. The sensor attached IC tag application high voltage equipment according to claim 1, wherein the sensor of the sensor attached IC tag is a temperature sensor for measuring a temperature at a position to which the sensor attached IC tag is attached.

7. The sensor attached IC tag application high voltage equipment according to claim 1, wherein the sensor of the sensor attached IC tag has a partial discharge detection function for detecting a partial discharge generated in the vicinity of the sensor attached IC tag.

8. The sensor attached IC tag application high voltage equipment according to claim 1, wherein the sensor attached IC tag includes a battery for supplying electric power for operating the sensor attached IC tag and has a battery charging function of charging the battery by receiving a radio transmitted from outside the equipment.

9. The sensor attached IC tag application high voltage equipment according to claim 1, wherein the container has a wall of which at least part of a surface is formed of a nonmetal and wherein the sensor attached IC tag is mounted into the container and communicates with an IC tag reader located outside the equipment.

10. The sensor attached IC tag application high voltage equipment according to claim 1, further includes an electrode unit which is electrically connected to a connection lead of other apparatus, located outside the container, wherein the sensor attached IC tag is mounted to the electrode unit and communicates with an IC tag reader located outside the equipment.

11. The sensor attached IC tag application high voltage equipment according to claim 1, wherein the electric time constant corresponds to a product of an electric resistivity and a dielectric constant of the separate semiconductor material.

12. The sensor attached IC tag application high voltage equipment according to claim 1, wherein the sensor attached IC tag covered with the semiconductor material is arranged on an exterior portion of the container having the high voltage unit provided within.

* * * * *